United States Patent Office 3,056,735
Patented Oct. 2, 1962

3,056,735
METHOD OF ADHERING CURED SILICONE RUBBER
Robert Smith-Johannsen, Niskayuna, N.Y., assignor to S-J Chemical Company
No Drawing. Filed Oct. 7, 1955, Ser. No. 539,283
5 Claims. (Cl. 204—154)

This invention relates to cured silicone rubber compositions having residual bonding properties and improved adhesion properties and to methods of making the same. More particularly, the invention relates to cured silicone rubber compositions which have been cured by subjecting polyorganosiloxanes which are convertible to the solid elastic state and containing calcium carbonate to radiation from a high energy source. The invention also includes methods of curing silicone rubber compositions and methods of adhering silicone rubber compositions to surfaces.

The new silicone rubber compositions of this invention are useful as adhesives, electrical insulation and in other fields where silicone rubber has been used.

Silicone rubber compositions have in the past been cured by means of a catalyst such as benzoyl peroxide. Catalytically cured silicone rubbers are relatively inert, are difficult to bond or adhere to surfaces such as metallic and ceramic surfaces, and do not have residual bonding properties after they have been cured. Catalytically cured silicone rubber compositions and present methods of bonding them to surface have many disadvantages. For example, in order to effectively bond catalytically cured rubber to a surface, it is necessary to apply the silicone rubber to the surface in the uncured or semi-cured state and effect a bond by curing it in situ. Application of heat and pressure to effect the cure must be carefully controlled in order to obtain a good bond.

I have found that by subjecting a polyorganosiloxane, which is convertible to the solid, elastic state, containing calcium carbonate, to radiation from a high energy source, that the cured silicone rubber develops residual bonding properties permitting the cured silicone rubber to be adhered or bonded to glass and metallic surfaces by the application of heat and pressure only. No priming of the surfaces to which the silicone rubber is to be bonded is necessary. No such residual bonding properties are present in catalytically cured silicone rubber. The silicone rubber cured according to this invention also possesses the advantages of catalytically cured silicone rubber and in addition obviates many of the disadvantages thereof, besides imparting new and advantageous properties thereto.

Various polyorganosiloxanes convertible to the solid, elastic state, can be cured according to this invention. The convertible polyorganosiloxanes may be viscous masses or gummy solids depending upon the state of condensation. Convertible polyorganosiloxanes, or silicone elastomers are well known in the art. Polyorganosiloxanes containing the same or different silicon-bonded organic substituents such as methyl, ethyl, propyl, phenyl, phenylethyl, both methyl and phenyl, and the like, connected to the silicon atoms by carbon-silicon linkage can be used. Some specific examples of convertible polyorganosiloxanes are polydimethylsiloxane and partially phenyl substituted polydimethylsiloxane.

The convertible polyorganosiloxanes generally comprise polymeric diorganosiloxanes containing less than 5 or 2 mol percent copolymerized mono-organosiloxane such as copolymerized monomethylsiloxane. It is generally preferred to use a liquid polyorganosiloxane containing about 1.98 to about 2.2 organic groups, such as methyl groups, per silicon atom to form the convertible polyorganosiloxane, and where more than 95% of the silicon atoms have two organic groups linked thereto.

Convertible polyorganosiloxanes can be obtained, for example, by hydrolyzing substantially pure dimethyldichlorosilane to form a liquid polymethylsiloxane, separating the liquid polymethylsiloxane, and condensing it with a condensing agent such as a small amount, about 0.01%, of KOH until a highly viscous mass bordering on a gummy solid is obtained. The resulting convertible polymethylsiloxane has about two methyl groups per silicon atoms.

Various types of radiation can be used to cure the convertible polyorganosiloxanes according to this invention. I have found that electron beam radiation or high velocity electrons obtained from a Van de Graaf generator, a resonant transformer or cathode ray tube, and gamma ray radiation are particularly advantageous sources of radiation. Various type of radiation are also disclosed in an article by K. H. Sun entitled "Effects of Atomic Radiation on High Polymers" published in the September 1954 issue of Modern Plastics.

The dosage of radiation used to cure the silicone elastomers of this invention is not critical and can be controlled by those skilled in the art to produce the desired consistency in the resulting cured silicone rubber. The measure of radiation from different sources with different energy ranges and which vary in efficiency should be taken into account when curing the silicone elastomers according to this invention. When using high energy electron beam radiation from a cathode ray device or resonant transformer, I have found that a dosage of between about 3 and 8 mega roentgens is advantageous.

The amount of calcium carbonate which can be incorporated into the convertible polyorganosiloxanes is not critical and can be varied over a fairly wide range. I have found that it is advantageous to use between about 30 to 35% by weight calcium carbonate based on the weight of the polyorganosiloxane used.

*Example 1.*—100 parts by weight of a polydimethylsiloxane formed by condensing a liquid polymethylsiloxane with 0.01% KOH until a highly viscous mass or gum was obtained and having approximately two methyl groups per silicon atom was thoroughly mixed with 50 parts by weight of calcium carbonate. The above convertible polydimethylsiloxane was then calendered onto glass cloth to a thickness of about 0.015 inch. The glass cloth had previously been heat-cleaned to remove the starch sizing. The calendered polydimethylsiloxane together with the glass cloth backing was subjected to high energy electron beam radiation from a resonant transformer type cathode ray device. The dosage was 5 mega roentgens. The cured polydimethylsiloxane rubber was then stripped from the glass cloth backing giving an unsupported cured silicone rubber film. The cured rubber was tack free and had good tensile strength, elongation, compression set, heat aging, and electrical properties.

Portions of the cured silicone rubber of Example 1 were placed on pieces of clean copper, heat-cleaned glass cloth, tin, steel and aluminum and heated at a temperature of 150° C. for 10 minutes at about 50 p.s.i. The cured silicone rubber was strongly bonded to the copper, glass cloth, tin, steel and aluminum.

Other portions of the cured silicone rubber of Example 1 were placed on pieces of copper, glass cloth, tin, steel and aluminum and heated to a temperature of 200° C. for about 2 minutes at about 50 p.s.i. After the heating period, these samples were also strongly bonded to the copper, glass cloth, tin, steel and aluminum.

In the above example, other backing materials such as metals or plastics can be used. Copper is an example of a metal and phenolic laminate an example of a plastic. Other polyorganosiloxanes such as partially substituted phenyl polydimethylsiloxane can also be used.

I claim:
1. The method of adhering silicone rubber to surfaces which comprises subjecting an organopolysiloxane convertible to the solid, elastic state containing calcium carbonate to radiation from a high energy source to cure the organopolysiloxane to a tack free state, contacting the cured tack free organopolysiloxane with the surface and adhering the cured organopolysiloxane to the surface by application of heat and pressure.

2. The method of claim 1 in which the organopolysiloxane is a member of the group consisting of polydimethylsiloxane and phenyl substituted polydimethylsiloxane.

3. The method of claim 2 in which the source of radiation is high velocity electrons.

4. The method of claim 1 in which the surface is metallic.

5. The method of claim 1 in which the surface is glass.

References Cited in the file of this patent
UNITED STATES PATENTS

| | | |
|---|---|---|
| 2,460,795 | Warrick | Feb. 1, 1949 |
| 2,744,878 | Smith-Johannsen | May 8, 1956 |
| 2,763,609 | Lewis et al. | Sept. 18, 1956 |

OTHER REFERENCES

Charlesby: "Nature," Apr. 10, 1954, vol. 173, pp. 679, 680.

Lawton et al.: "Nature," July 11, 1953, vol. 172, pp. 76, 77.

Monk, G. S.: "Coloration of Optical Materials by High Energy Radiation," ANL-4536, pp. 24, 25 (July 1950).

Sun: "Modern Plastics," vol. 32, pp. 233, 238 (September 1954).

Bovey: "Effects of Ionizing Radiation on Natural and Synthetic High Polymers," pp. 16–24 (1958).

Burton: "Mechanism of Radiation Chemical Reactions in Organic and Aquo-Organic Systems," pp. 205–206 (1952).

Ellis et al.: "The Chemical Action of Ultraviolet Rays," pp. 26–27 (1941).

Martin: "Chemical and Engineering News," vol. 33, pp. 1424–1428, Apr. 4, 1955.